United States Patent
Kambhatla et al.

(10) Patent No.: US 9,417,726 B2
(45) Date of Patent: Aug. 16, 2016

(54) SUPPORTING KEYBOARD AND MOUSE OVER EMBEDDED DISPLAYPORT WITHOUT USING A UNIVERSAL SERIAL BUS

(71) Applicant: Intel Corporation, Santa Clara, CA (US)

(72) Inventors: Srikanth Kambhatla, Portland, OR (US); Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 226 days.

(21) Appl. No.: 13/872,309

(22) Filed: Apr. 29, 2013

(65) Prior Publication Data
US 2014/0320423 A1 Oct. 30, 2014

(51) Int. Cl.
*G06F 3/041* (2006.01)
*G06F 3/038* (2013.01)

(52) U.S. Cl.
CPC ............. *G06F 3/0416* (2013.01); *G06F 3/038* (2013.01); *G06F 2203/0381* (2013.01)

(58) Field of Classification Search
CPC ............... G06F 3/0416; G06F 3/038; G06F 2203/0381; G06F 3/0412; G06F 3/0213; G09G 5/006
USPC ................................... 345/168–173
See application file for complete search history.

(56) References Cited

U.S. PATENT DOCUMENTS

| | | | |
|---|---|---|---|
| 9,262,000 B2 * | 2/2016 | Kambhatla | G06F 3/0412 |
| 2008/0297475 A1 * | 12/2008 | Woolf et al. | 345/163 |
| 2010/0295794 A1 * | 11/2010 | Russ et al. | 345/173 |
| 2012/0268378 A1 * | 10/2012 | Tokutake | 345/168 |
| 2013/0027315 A1 * | 1/2013 | Teng | G06F 3/0488 345/173 |

OTHER PUBLICATIONS

U.S. Appl. No. 61/551,712 entitled "Multi-Touch Interface Schemes," filed Oct. 26, 2011 (34 pages).
Video Electronics Standards Association, "Proposed VESA Multi-Touch Section for eDP 1.4," 2012, Version 1, draft 3, Aug. 2012 (34 pages).

* cited by examiner

*Primary Examiner* — Rodney Amadiz
(74) *Attorney, Agent, or Firm* — Trop Pruner & Hu, P.C.

(57) ABSTRACT

A human interface sink device may be selectively enabled with at least one of an embedded keyboard, embedded mouse, touch-based keyboard, a touch-based mouse function in addition to a multi-touch function.

22 Claims, 5 Drawing Sheets

SUPPORTING KEYBOARD AND MOUSE OVER EMBEDDED DISPLAYPORT WITHOUT USING A UNIVERSAL SERIAL BUS

BACKGROUND

Recently developed display interface schemes, such as DisplayPort® (DP) display interface protocol or standard (see, e.g., DisplayPort® version 1.2) (December 2009)), replace older standards, such as the video graphics array and digital video interface and rely on packetized data transmission similar to other data communication protocols, such as Internet, Universal Serial Bus, and Peripheral Component Interface Express. For example, DP supports both external (e.g., box-to-box) and internal (e.g., laptop display panel), display connections, and, unlike digital video interface and low voltage differential signaling standards, where differential pairs transmit pixel data and a clock signal, the DP protocol is based on transmission of small data packets with an embedded clock. The use of data packets allows interface standards, such as DP, to be extensible by permitting additional features to be added without significant changes to the interface itself.

Embedded DisplayPort (eDP) is intended to refer to a companion standard (see, e.g., embedded DisplayPort, version 1.3) (February 2011)) to the DP standard that provides a standard display panel interface for internal connections (e.g., between a graphics processor and a notebook display panel) and replaces the low voltage differential signaling standard.

BRIEF DESCRIPTION OF THE DRAWINGS

Some embodiments are described with respect to the following figures.

DETAILED DESCRIPTION

The phrase "human interface device" (HID) as used herein describes devices to control the operation of computer systems. See "Device Class Definition for Human Interface Devices (HID)", Firmware specification, version 1.11, published Jun. 27, 2001, hereinafter the "HID 1.11" specification.

The phrase "touch data" is used synonymously with the phrase "multi-touch data" and, as used herein, refers to data that describes one or more locations where a contact with a sensitive surface has occurred.

A "touch sink" or "touch sink device" are used synonymously with the term "sink" and "sink device" and refer to a sink device configured to support the DisplayPort (DP) and/or embedded DisplayPort (eDP) standards and that are capable of reporting touch data.

The phrase "touch source" or "touch source device" are used synonymously with the term "source" and the phrase "source device" and are used to refer to a source device as defined in DP 1.1 standard that is configured to process touch data received, for example, from the touch sink device.

While the various devices, systems, and processes described herein are explained in the context of DP and/or eDP, the present disclosure is not limited to any particular touch and/or displays, interface standards, or specifications.

While the various systems, devices, and processes described herein are explained in the context of touch data, the present disclosure is not limited to touch data and/or touch devices. Hence, because information passed between a touch sink and a touch source may be HID compliant, a touch sink may present other types of HID devices, including, but not limited to, a keypad, an alpha numeric display, and so forth. Thus, the various interface schemes and/or processes described herein may be applied to other types of HID devices that may be presented by a touch sink, and may apply to any combination of one or more types of HID devices with HID touch devices.

Further, while the term "interface data" may be used herein to refer largely to touch data, in various implementations, the interface data, in accordance with the present disclosure, may refer to data generated by any type of HID device, such as a keypad, an alpha numeric display, and the like.

A touch sink may include touch sensors to generate raw touch data and a formatter to convert raw touch data into formats described herein. Further, a touch sink may be configured to transfer touch data to a touch source. A touch source may have the ability to receive or obtain touch data from a touch sink, in addition to being configured to parse and/or interpret the touch data as described herein.

Figure 1:
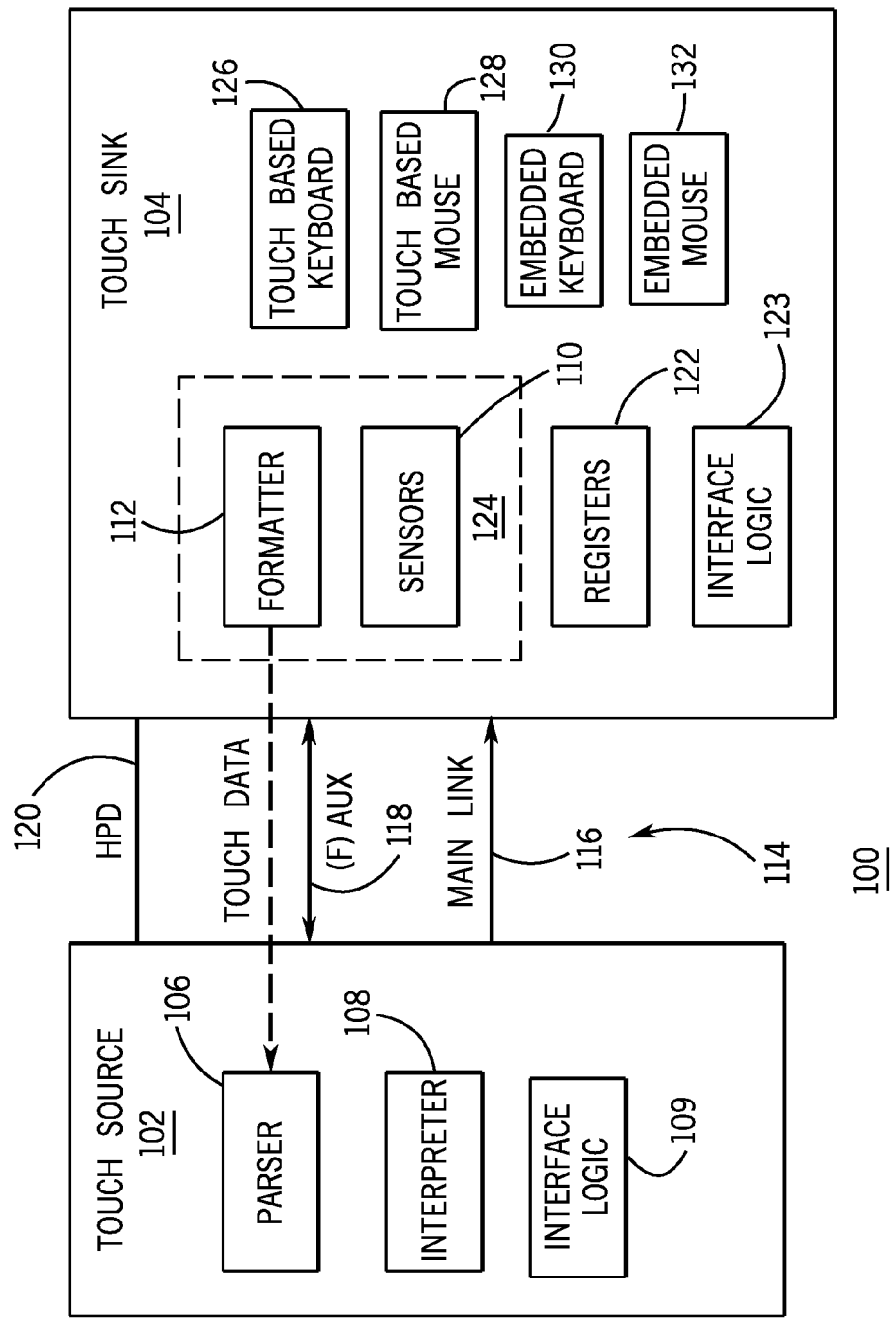
FIG. 1 is a schematic depiction of a first display interface system according to one embodiment.

For example, FIG. 1 describes a multi-touch display interface system 100, according to one embodiment, including a touch source 102 communicatively coupled to a touch sink 104.

The touch source 102 may be configured to implement the DP 1.2 standard and may include a microprocessor, such as a graphics processing unit, a digital signal processor, or other devices configured to parse and interpret interface data, such as touch data, using a parser module 106 and an interpreter module 108, respectively. A touch source 102 may also include interface logic 109 to implement processes described herein subsequently. For example, the interface logic 109 may include logic to implement data transfer processes or portions thereof, described in more detail hereinafter.

The touch sink 104 may include a multi-touch capable display (not shown) to capture interface data in the form of multi-touch data and to format the touch data using touch sensors 110 and formatter module 112, respectively. The touch sensors 110 may be any type of touch sensors, such as capacitive type sensors, enabling touch sink 104 to capture multi-touch data. The touch sink 104 may also include interface logic 123 to implement processes described herein subsequently. For example, the interface logic 123 may include logic to implement data transfer processes, described in more detail hereinafter.

The touch sink 104 may be incorporated into a mobile communication device, such as a smart phone, mobile computer, tablet computer, or the like. The components of the system 100 may be implemented within a single device, such as a mobile communications device, a tablet computer, or other computing devices where the touch sink 104 may correspond to one or more logic and/or hardware modules associated with a touch screen display and touch source 102 may include a microprocessor communicatively coupled to the logic and/or hardware modules of touch sink 104.

As shown in FIG. 1, the system 100 includes a DP link 114, communicatively coupling touch sensor 102 to touch sink 104 and including a main link 116, an auxiliary or fast-auxiliary channel ((F)AUX) 118 and a hot plug detect (HPD) signal line 120. In various implementations, main link 116 may be a unidirectional, high bandwidth, and low latency channel used for the transport of isochronous streams, such as uncompressed video and/or audio data from touch source 102 to touch sink 104. A channel 118 may be a half-duplex bidirectional channel used for link management and device control using schemes in accordance with the present disclosure. For example, in various implementations, touch source 102 and touch sink 104 may be designated as master and slave, respectively. In general, transactions over the fast-auxiliary channel 118 are implemented by touch source 102. However, in other implementations, touch sink 104 may prompt the initiation of fast-auxiliary channel transactions by, for example, sending an interrupt (IRQ) to touch source 102 over signal line 120.

Figure 2:
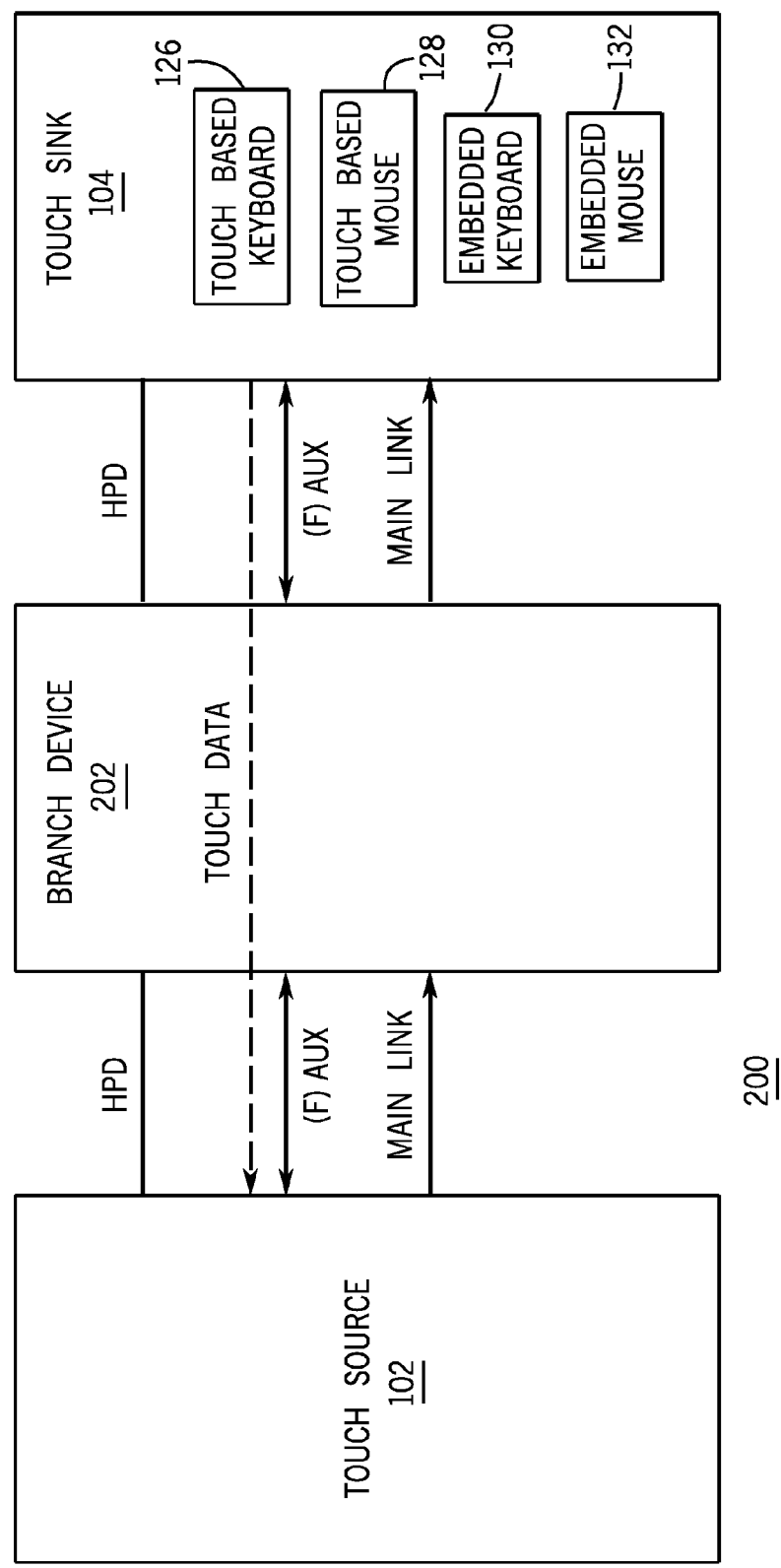
FIG. 2 is a schematic depiction of a second display interface system according to one embodiment.

The multi-touch display interface systems and/or schemes may include one or more intervening devices and/or systems communicatively coupling a touch sink with a touch source. For example, FIG. 2 illustrates a multi-touch display interface system 200, according to one embodiment, including an intervening branch device 202, communicatively coupling touch source device 102 to touch sink 104. In various implementations, a branch device 202 may be a device configured in accordance with the DP 1.2 standard and may implement side band messages, as described subsequently. Further, in some embodiments, a branch device may process downstream signals, such as interrupts appearing on the HPD signal line, within specific time limits based on the rate at which touch sink 104 generates touch data. For example, branch device 202 may need to process interrupts within 20 milliseconds to support a minimum touch data sample rate of 50 Hertz.

Returning to FIG. 1, touch source 102 may obtain interface data, such as touch data, from touch sink 104 over a fast-auxiliary channel 118, where the touch data may be in a human interface device (HID) format, as defined by an HID descriptor report (see, Device Class Definition for Human Interface Devices, (HID) firmware specification, version 1.11, published Jun. 27, 2001, hereinafter, the HID 1.1 specification). Further, a touch sink 104 may conform to touch-related format requirements as set forth in the multi-touch extensions for digitizers (see, "Addition of Usages Related to Multi-Touch Digitizers", request # HUTRR34, published Feb. 27, 2009, hereinafter the HUTRR34 document that modified the HID usage tables (see, "HID Usage Tables," version 1.12, published Oct. 28, 2004)). In addition, touch sink 104 may expose touch capability as a digitizer device, in accordance with the HID 1.11 specification. The HID information, including HID report descriptors, may be conveyed between touch sink 104 and touch source 102 over the fast-auxiliary channel 118.

The touch sink 104 may include registers 122 to temporarily store data, such as configuration data, touch data, and other data that may be accessed by touch source 102 via the fast-auxiliary channel 118. The registers 122 may include DP configuration data (DPCD) registers and touch source may have read and write access to those DPCD registers. A data module 124, including sensors 110 and formatter module 112, may be configured in response to one or more DPCD register or registers 122.

The touch sink 104 may support a sample rate of at least 50 Hertz for touch data. Touch sink 104 may convey touch data related interrupts to a touch source 102 and touch source 102 may process those interrupts at a rate commensurate with the sample rate of the touch sink 104. For example, the touch sink 104 may convey IRQ_HPD interrupts to touch source 102 via a signal line 120. While the DP 1.2 standard requires source devices to process an IRQ_HPD within 100 milliseconds, in various implementations, a touch source 102 may process an IRQ_HPD within 20 milliseconds to support processing of touch data sampled at a rate of 50 Hertz by a touch sink 104.

In addition, a touch sink may also support touch based keyboard 126, touch based mouse 128, an embedded keyboard 130, or an embedded mouse 132 (these four functions collectively referred to as KBM). When they are supported, the touch sink may conform to a corresponding format requirement set forth in the HID specifications.

A touch sink device may announce its capability through a touch capability DPCD register. Within that register, the sink a set a TOUCH_SUPPORTED bit if a touch capability is supported and sets EKBM_SUPPORTED bit if embedded keyboard or embedded mouse functions are supported. Bit 1 of Touch Field TOUCH_CAPABILITY having DisplayPort Address of 60006h can be used to store EKBM_SUPPORTED. In some cases, EKBM_SUPPORTED=1 can mean sink supports embedded keyboard and/or mouse, whereas EKBM_SUPPORTED=0 can mean sink does not support embedded functions. A touch source may read this DPCD register as part of a sink capability discovery triggered by sink discovery.

Touch sink devices may make an HID descriptor and an HID report descriptor available using formatting described in the HID specifications. These two descriptors are accessible from HID_CLASS_DESCRIPTORS DPCD registers respectively. A touch source reads these descriptors after determining touch capability in the hot plugged sink device.

The class descriptors declare and the HID descriptor may immediately follow the HID descriptor and the HID_DESCRIPTORS_DPCD registers in the order in which they were declared in the HID descriptor.

By default, a touch sink may have the touch function enabled and embedded KBM functions disabled.

A touch source can configure a touch sink in the following ways in one embodiment.

| Configuration Bit | Description |
| --- | --- |
| ENABLE_TOUCH | Enable or disable touch feature in the sink device |
| DATA_ACCESS_METHOD | Configure sink device for interrupt generation |
| RESET | Reset touch functionality (hardware/firmware) in the Sink device |
| GET_FEATURE_REPORT | Get the feature report for the specified Report ID |
| SET_FEATURE_REPORT | Drive a Feature Report out to the touch sink |
| SET_OUTPUT_REPORT | Drive an Output Report to the touch sink |
| SET_IDLE_RATE | Configure rate at which Input Reports are generated in the sink device |
| SET_LOW_POWER | Put the touch feature in the sink to low power state |
| EKBM_ENABLE | Enables the embedded keyboard and/or mouse functions. |

A touch sink acknowledges success or failure to the following commands through standard DPCD AUX transaction mechanisms defined in the DisplayPort 1.2 standard.

A touch source disables the touch feature in the touch sink by setting the ENABLE_TOUCH bit in the CONFIGURE_TOUCH DPCD register to zero. Similarly it may enable the touch feature by writing a one to that bit.

A touch source may disable touch related IRQ_HPD interrupt generation from the touch sink by setting the DATA_ACCESS_METHOD bit in the CONFIGURE_TOUCH DPCD register to polled. Similarly it enables IRQ_HPD interrupt generation by setting the bit to interrupt.

A touch source may reset touch functionality in the touch sink by setting the reset bit in the CONFIGURE_TOUCH DPCD register to one. The touch sink brings touch related hardware and firmware to reset condition in response to this command. In particular, this reset condition disables touch sensing in the sink, flushes the input report queue and resets the TOUCH_STATUS register to indicate no report data available either from source or from sink.

A touch source issues a read request for a feature report by writing the report identifier of interest to TOUCH_PARAMETERS [0] DPCD register and by setting the GET_FEATURE_REPORT bit in the CONFIGURE_TOUCH DPCD register to one. The touch sink indicates availability of a feature report to be read in REPORT_DATA DPCD region at offset zero.

A touch source issues a feature report by doing both the following. It writes the size of the feature report to the feature report size area in the REPORT_DATA DPCD region and the feature report itself to the feature report area. It also issues a report by setting the SET_FEATURE_REPORT bit in the CONFIGURE_TOUCH DPCD register to one.

A touch source may issue an output report by writing the size of the output report to the output report size area and the OUTPUT_REPORT DPCD region and the output report itself to the output report area and by setting the SET_OUTPUT_REPORT bit in the CONFIGURE_TOUCH DPCD register to one.

A touch source sets the reporting rate for input reports by writing the parameters for this command in the IDLE_RATES DPCD region and by setting the SET_IDLE_RATE bit in the CONFIGURE_TOUCH DPCD register.

A touch source sets the touch component in the sink to sleep state by setting the SET_LOW_POWER bit in the CONFIGURE_TOUCH DPCD register to one. When SET_LOW_POWER is zero, the touch feature may be in an on state. This bit is valid only when the sink is in the active state.

A touch source gets the EKBM_ENABLE bit in the CONFIGURE_HID register to enable embedded keyboard and/or mouse functions in the touch sink.

The HID_CLASS_DESCRIPTORS DPCD registers contain an array of HID class descriptors, where the first descriptor is an HID descriptor. The HID descriptor identifies the revision of the HID specification that it supports, and any other information specific to the HID device.

The bNumDescriptors field of the HID descriptor defines the number of additional HID class descriptors available.

The bNumDescriptors field is followed by an array of three byte entries, where the first byte of an entry defines the type of the HID class descriptor and remaining two bytes of an entry to define the size of the HID class descriptor.

The input, output and feature reports may be available over eDP. The touch sources can originate output and feature reports and touch sinks can originate input and feature reports.

A touch sink stores the input report and when applicable feature report in REPORT_DATA DPCD registers.

The report descriptor identifies the size of each feature report defined by a device. If more than one feature report is declared in the report descriptor, then they are distinguished by the report identifier inserted as the first byte of each report.

A touch sink populates the feature report area with the feature report identified by the report ID specified by the touch source and TOUCH_PARAMETERS[0]. The feature report size field identifies the number of valid bytes in the feature report area for the requested feature report.

A touch source can generate output reports and feature reports. A touch source stores when applicable the output report in the OUTPUT_REPORT DPCD region. The report descriptor defines the maximum size of the output reports subregion. The size of an output report may vary based on the content that a touch source wants to drive.

If a report descriptor uses report identifiers to identify multiple reports of a specific type (e.g. feature, input or output), then a size of the report subregion may be the union of the size of all reports defined of the same type. Software on the touch source may determine the maximum size of each report by parsing the report descriptor and the number of valid bytes in the current report by examining the size field preceding the report's subregion.

A touch sink may transfer touch data either over the AUX channel as indicated in FIG. 2-1. A sequence of events is as follows in one embodiment. A touch source configures a touch sink to generate interrupts through DATA_ACCESS_METHOD bit in the CONFIGURE_TOUCH DPCD register. The touch sink is configured to enable touch feature in the sink by setting ENABLE_TOUCH bit in the CONFIGURE_TOUCH DPCD register. These two operations can be combined into one single AUX write.

When needed, the touch source requests a feature report for a particular report identifier by setting TOUCH_PARAMETERS[0] to the desired report identifier and by setting GET_FEATURE_REPORT bit in TOUCH_COMMAND_DPCD register.

On availability of each instance of fresh touch data, the touch enabled sink may do the following. If INPUT_REPORT_AVAILABLE bit in the TOUCH_STATUS DPCD register, and the TOUCH_INTERRUPT bit are clear, then it populates the touch data in the import region in the REPORT_DATA. It also sets the reason for the interrupt. It sets INPUT_REPORT_AVAILABLE and sets the TOUCH_INTERRUPT bit in the DEVICE_SERVICE_IRQ_VECTOR. It also asserts IRQ_HPD.

On detection of GET_FEATURE_REPORT equal one, the TOUCH_SINK reads the report identifier from TOUCH_PARAMETERS [0]. If the FEATURE_REPORT_AVAILABLE bit in the TOUCH_STATUS DPCD register and the TOUCH_INTERRUPT bit are clear then it populates the feature report for the desired report identifier at REPORT_DATA [0] and it sets the reason for interrupt. It sets the FEATURE_REPORT_AVAILABLE and sets the TOUCH_INTERRUPT bit in the DEVICE_SERVICE_IRQ_VECTOR and asserts IRQ_HPD.

On IRQ_HPD, the touch source reads DEVICE_SERVICE_IRQ_VECTOR to check if TOUCH_INTERRUPT bit is set. If so, it reads the TOUCH_STATUS DPCD register to determine if either INPUT_REPORT_AVAILABLE or FEATURE_REPORT_AVAILABLE bits are set. If not, the interrupt service routine exits from the touch input processing. If so, it also reads the data input or feature report corresponding to the available indication. It also clears the interrupt reason.

For a polled source access to input or feature report, the sequence of events is as follows in one embodiment. The touch source configures a touch sink to not generate IRQ_HPD interrupts by setting DATA_ACCESS_METHOD bit to polled in the CONFIGURE_TOUCH DPCD register and enables touch features in the sink by setting ENABLE_TOUCH bit in the CONFIGURE_TOUCH DPCD register. These two operations can be combined into a single AUX write.

When needed, the touch source requests a feature report for a particular report identifier by setting TOUCH_PARAMETERS [0] to the desired report identifier and by setting GET_FEATURE_REPORT bit in TOUCH_COMMAND DPCD register. The input source polls the availability flags corresponding to the reports until they are set. The touch sink populates the input report and/or feature report into TOUCH_DATA region. It sets the corresponding availability bits in TOUCH_STATUS but does not set TOUCH_INTERRUPT bit and does not raise an IRQ_HPD. Once the touch source determines that one or both input availability flags is/are set, it reads the corresponding reports from REPORT_DATA DPCD registers and clears the availability flag or flags that was or were found set.

A touch source can disable interrupts to minimize latency associated with interrupt notifications in some embodiments. System software on a touch source needs to handle the switch between interrupt based data access and polled data access carefully to minimize risk of losing data.

Once the touch source enables interrupt access method, a touch sink may immediately generate an interrupt if its previously generated input and/or feature report(s) are already available. Similarly if a touch sink is waiting for TOUCH_INTERRUPT bit to be cleared in order to populate input and/or output feature report(s), it may abort that wait if the touch source disables interrupt access method.

The sequence of events in a sink access to an output report are as follows in one embodiment. The touch source configures a touch sink to enable either an interrupt or polled access and enables touch in a sink by setting ENABLE_TOUCH bit in the CONFIGURE_TOUCH DPCD register.

On availability of data to be communicated to the sink, the touch source first determines completion of a previous output report by waiting for SET_OUTPUT_REPORT to be zero. In the case of polled access, it polls OUTPUT_REPORT_READ bit to be set in the TOUCH_STATUS_DPCD register. In the case of interrupt access, the touch source fields an IRQ_HPD with TOUCH_INTERRUPT bit and OUTPUT_REPORT_READ bit set. Secondly, on completion of the previous step, the touch source writes the output report to its corresponding location in OUTPUT_REPORT_DPCD region, clears the OUTPUT_REPORT_READ bit, sets the SET_OUTPUT_REPORT bit in the CONFIGURE_TOUCH DPCD register and in the case of interrupt access, clears TOUCH_INTERRUPT bit.

When firmware on a touch sink detects a SET_OUTPUT_REPORT bit is one, it may read the output report, set the OUTPUT_REPORT_READ bit, in the case of interrupt access, wait for the TOUCH_INTERRUPT bit to be cleared and set it and clear SET_OUTPUT_REPORT bit.

To enable a sink to access feature report, the sequences of events are very similar to accessing an output report. The following changes may be implemented in some embodiments. A touch source may set and a touch sink may clear the SET_FEATURE_REPORT bit rather than the SET_OUTPUT_REPORT bit in the CONFIGURE_TOUCH DPCD register. Another change is that read and write rates may be controlled using FEATURE_REPORT_READ bit rather than OUTPUT_REPORT_READ bit. Also, the FEATURE_REPORT may be made available in the REPORT_DATA DPCD region at offset zero. In addition, the report identifier for which the feature report is being set is communicated in the TOUCH_PARAMETERS[0] DPCD register.

The concurrency of touch with keyboard may be handled as follows in one embodiment. If a sink defines a keyboard application collection in the same report descriptor as a digitizer device, then a touch keyboard is defined as follows. Firstly, a vendor may provide a vendor specific method to allow a user to enable or disable the display of a soft touch keyboard on the screen or may have an embedded keyboard leaving the entire screen available for touch. Secondly, when a touch keyboard or the embedded keyboard interprets keystrokes, the keystrokes are transmitted to the source using the keyboard interface. Thirdly, if a touch keyboard does not cover the whole screen, then touches over the touch keyboard may be interpreted as keystroke and may be transmitted over the keyboard interface. Single or multiple touches over the remaining area may be transmitted over the surface interface. Fourthly, multi-touches reported by the touch interface may not include any touches over the touch keyboard.

Concurrency of touch with mouse may be handled as follows in some embodiments. A sink defines a mouse application collection in the same report descriptor as a digitizer device. The digitizer functionality may be referred to as a touch screen. The mouse functionality may be either touch based or it may be an embedded mouse. When an embedded mouse is not present, the touch screen defines a device mode [3] usage, where the default value is zero—report as a mouse. The device mode may be changeable dynamically through set feature requests from the source. A touch screen without embedded mouse may start reporting as a mouse when device mode is zero. A touch mouse may interpret single touches as absolute mouse position on the screen and may transmit to the source using HID mouse reports. The touch mouse may not generate any reports when multi-touch input is detected. A touch screen does not generate reports in some embodiments. A touch screen without embedded mouse starts reporting as a single input device when the device mode is one. A touch screen generates reports when single touch input is detected. The touch screen does not generate any reports from multi-touch input is detected and the touch mouse does not generate any reports. A touch screen without embedded mouse starts reporting as a multiple input device when the device mode is two. The touch screen generates reports when single or multi-touch input is detected and they may be transmitted to the source with contact count indicated in a number of valid touches. A touch mouse does not generate any reports. A device with touch screen and embedded mouse may generate touch reports on single or multiple touches on the touch screen and generates HID mouse reports from movements with the embedded mouse. Device mode is not used in this scenario.

Concurrency of touch with keyboard and mouse is handled as follows in some embodiments. A sink defines mouse and keyboard application collections in the same report descriptor as a digitizer device. When the keyboard and mouse are embedded device, all three functions are available concurrently. When one of the keyboard or the mouse functions is embedded and the other is touch based, the embedded function is available concurrently with the touch and the other function that is touch based. When both keyboard and mouse are touch based, the device supports device mode usage that defaults to mouse (device mode equals to zero). In this mode touch and keyboard functions are not supported in some embodiments. In device mode 1, the device reports as a single input device transmitting either keyboard reports or touch HID reports depending on location of the touch being keyboard area or touch screen area respectively. When in device mode 2, the device reports as a multiple input device transmitting keyboard and/or touch HID reports depending on the location of the touch.

A sink may not have more than one instance of touch-based or embedded keyboard or mouse functionality in some embodiments.

In accordance with some embodiments a sequence may be implemented in software, firmware and/or hardware. In software and firmware embodiments it may be implemented by computer executed instructions stored in one or more non-transitory computer readable media such as magnetic, optical or semiconductor storages. For example, such firmware or software may be stored in such a device within the touch sink shown in FIG. 1 and particularly, the data module 124.

Figure 3:
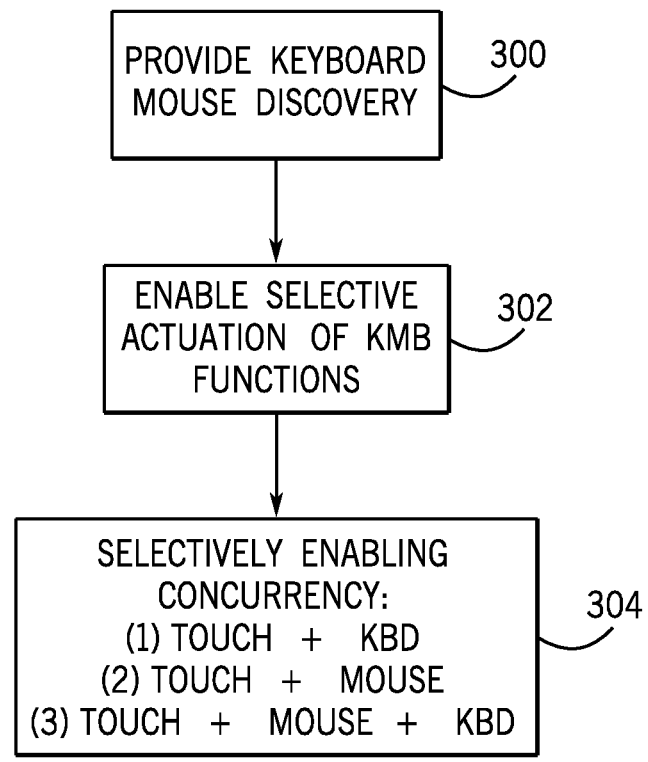
FIG. 3 is a flow chart for one embodiment.

The sequence shown in FIG. 3 may begin by providing keyboard and mouse discovery as indicated in block 300. Then actuation of keyboard and mouse functions may be selectively enabled (block 302). In other words, any one or more of touch plus keyboard or touch plus mouse functions or touch plus keyboard and mouse functions may be provided including touch keyboard, touch mouse, embedded keyboard and/or embedded mouse.

Then as shown in block 304, concurrency may be selectively enabled for touch plus keyboard, touch plus mouse, or touch plus keyboard and mouse.

Figure 4:
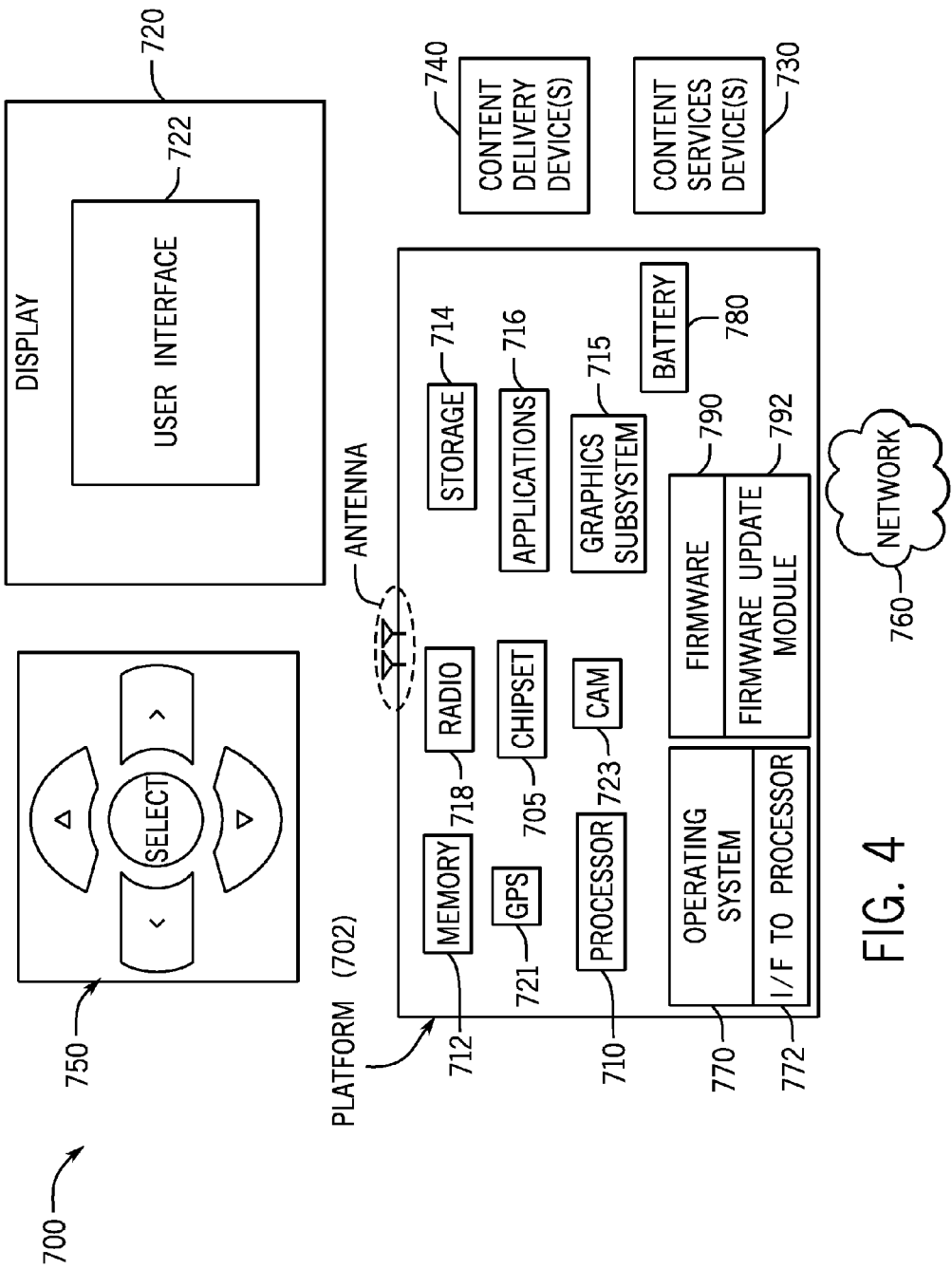
FIG. 4 is a system depiction for one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
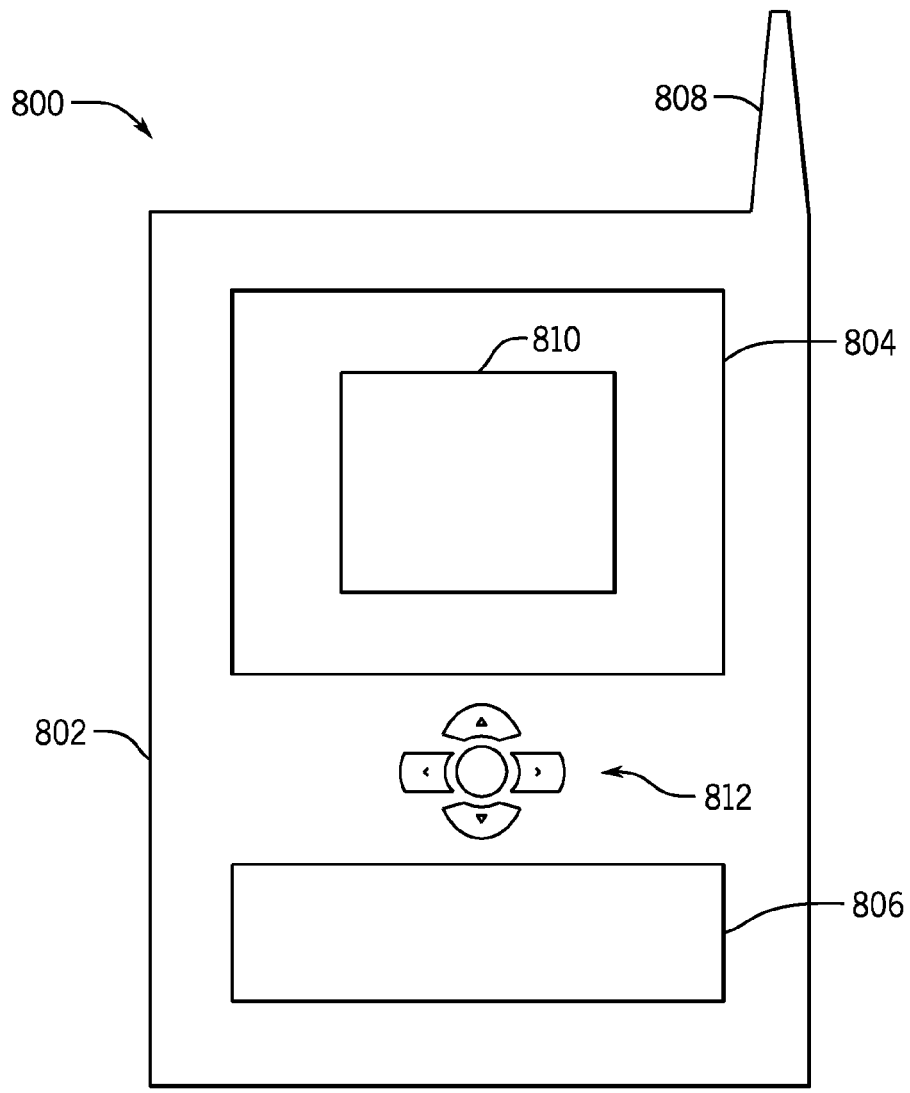
FIG. 5 is a front elevational view of one embodiment.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 2 in software and/or firmware embodiments.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising selectively enabling a human interface sink device with at least one of an embedded keyboard, embedded mouse, touch-based keyboard, a touch-based mouse function in addition to a multi-touch function. The method may also include providing a capability discovery mechanism to enable discovery of keyboard and/or mouse functions of the sink device in addition to a multi-touch function. The method may also include enabling concurrent touch and keyboard functions in the sink device. The method may also include enabling concurrent touch and mouse functions in the sink device. The method may also include enabling concurrent touch, keyboard and mouse functions in the sink device.

In another example embodiment may be one or more transitory computer readable media storing instructions that cause a processor to selectively enable a human interface sink device with at least one of an embedded keyboard, embedded mouse, touch-based keyboard, a touch-based mouse function in addition to a multi-touch function. The media may further store instructions to provide a capability discovery mechanism to enable discovery of keyboard and/or mouse functions of the sink device in addition to a multi-touch function. The media may further store instructions to enable concurrent touch and keyboard functions in the sink device. The media may further store instructions to enable concurrent touch and mouse functions in the sink device. The media may further store instructions to enable concurrent touch, keyboard and mouse functions in the sink device.

Another example embodiment may be a human interface sink device comprising a plurality of touch sensors and interface logic to selectively enable the human interface sink device with at least one of an embedded keyboard, embedded mouse, touch-based keyboard, a touch-based mouse function in addition to a multi-touch function. The device may include said interface logic to provide a capability discovery mechanism to enable discovery of keyboard and/or mouse functions of the sink device in addition to a multi-touch function. The device may include said interface logic to enable concurrent touch and keyboard functions in the sink device. The device may include said interface logic to enable concurrent touch and mouse functions in the sink device. The device may include said interface logic to enable concurrent touch, keyboard and mouse functions in the sink device.

In another example embodiment may be a human interface sink device comprising a touch keyboard and hardware to selectively enable a multi-touch function and concurrent touch and keyboard, touch and mouse, or touch, mouse and keyboard functions. The device may include said interface to enable concurrent touch and mouse functions in the sink device. The device may include said interface to enable concurrent touch, keyboard and mouse functions in the sink device. The device may include an operating system, a battery and firmware and a module to update said firmware.

References throughout this specification to "one embodiment" or "an embodiment" mean that a particular feature, structure, or characteristic described in connection with the embodiment is included in at least one implementation encompassed within the claims. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been discussed, those skilled in the art will appreciate numerous modifications and variations therefrom. It is intended that the appended claims cover all such modifications and variations as fall within the true spirit and scope of the claims.

What is claimed is:

1. A method comprising:
    determining whether a human interface sink device supports one or more keyboard and mouse functions, enabling each supported function to enable one display screen to implement one of concurrent touch screen plus keyboard functions, concurrent touch screen plus mouse functions, or concurrent touch screen plus keyboard and mouse functions; and
    selectively enabling the human interface sink device with a touch-based keyboard, in addition to a multi-touch function, all on said one display screen;
    sending touch data over an auxiliary (AUX) channel by configuring the sink device to handle touch data, configuring the sink device to generate an interrupt, when touch data is available, populating the data in a report and generating an interrupt, when the sink device sets a get report indicator with an identifier of a desired report, populating a register with the requested report, and generating another interrupt.

2. The method of claim 1 including providing a capability discovery mechanism to enable discovery of keyboard and/or mouse functions of the sink device in addition to a multi-touch function.

3. The method of claim 1 including enabling concurrent touch and keyboard functions in the sink device.

4. The method of claim 1 including enabling concurrent touch and mouse functions in the sink device.

5. The method of claim 1 including enabling concurrent touch, keyboard and mouse functions in the sink device.

6. One or more non-transitory computer readable media storing instructions that cause a processor to:
  determine whether a human interface sink device supports one or more keyboard and mouse functions, enable each supported function to enable one display screen to implement one of concurrent touch screen plus keyboard functions, concurrent touch screen plus mouse functions, or concurrent touch screen plus keyboard and mouse functions;
  selectively enable the human interface sink device with at least one of an embedded keyboard, embedded mouse, touch-based keyboard, a touch-based mouse function in addition to a multi-touch function; and
  send touch data over an auxiliary (AUX) channel by configuring the sink device to handle touch data, configure the sink device to generate an interrupt, when touch data is available, populate the data in a report and generating an interrupt, when the sink device sets a get report indicator with an identifier of a desired report, populate a register with the requested report and generate another interrupt.

7. The media of claim 6 further storing instructions to provide a capability discovery mechanism to enable discovery of keyboard and/or mouse functions of the sink device in addition to a multi-touch function.

8. The media of claim 6 further storing instructions to enable concurrent touch and keyboard functions in the sink device.

9. The media of claim 6 further storing instructions to enable concurrent touch and mouse functions in the sink device.

10. The media of claim 6 further storing instructions to enable concurrent touch, keyboard and mouse functions in the sink device.

11. A human interface sink device comprising:
  a plurality of touch sensors;
  interface logic to selectively enable the human interface sink device with a touch-based keyboard, in addition to a multi-touch function all on one display screen, to determine whether the human interface sink device supports one or more keyboard and mouse functions, enabling each supported function to enable one display screen to implement one of concurrent touch screen plus keyboard functions, concurrent touch screen plus mouse functions, or concurrent touch screen plus keyboard and mouse functions and to send to touch data over an auxiliary (AUX) channel by configuring the sink device to handle touch data, configuring the sink device to generate an interrupt, when touch data is available, populating the data in a report and generating an interrupt, when the sink device sets a get report indicator with an identifier of a desired report, populating a register with the requested report, generate another interrupt.

12. The device of claim 11 said interface logic to provide a capability discovery mechanism to enable discovery of keyboard and/or mouse functions of the sink device in addition to a multi-touch function.

13. The device of claim 11 said interface logic to enable concurrent touch and keyboard functions in the sink device.

14. The device of claim 11 said interface logic to enable concurrent touch and mouse functions in the sink device.

15. The device of claim 11 said interface logic to enable concurrent touch, keyboard and mouse functions in the sink device.

16. A human interface sink device comprising:
  a touch keyboard; and
  hardware to selectively enable the human interface sink device with a touch-based keyboard, in addition to a multi-touch function, all on one display screen, and to send touch data over an auxiliary (AUX) channel by configuring the sink device to handle touch data, configuring the sink device to generate an interrupt, when touch data is available, populating the data in a report and generating an interrupt, when the sink device sets a get report indicator with an identifier of a desired report, populating a register with the requested report and generate another interrupt.

17. The device of claim 16 said interface to enable concurrent touch and keyboard functions in the sink device.

18. The device of claim 16 said interface to enable concurrent touch and mouse functions in the sink device.

19. The device of claim 16 said interface to enable concurrent touch, keyboard and mouse functions in the sink device.

20. The device of claim 16 including an operating system.

21. The device of claim 16 including a battery.

22. The device of claim 16 including firmware and a module to update said firmware.

* * * * *